United States Patent [19]

Siwecki et al.

[11] 4,333,832
[45] Jun. 8, 1982

[54] ROTATING SOLUTION SEPARATION SYSTEM

[75] Inventors: Thomas L. Siwecki, 410 Civic Dr., Walnut Creek, Calif. 94596; Gerry B. Andeen, Menlo Park, Calif.

[73] Assignee: Thomas L. Siwecki, Walnut Creek, Calif.

[21] Appl. No.: 828,903

[22] Filed: Aug. 29, 1977

[51] Int. Cl.³ .............................................. B01D 31/00
[52] U.S. Cl. ............................. 210/195.2; 210/321.1; 210/433.2; 210/259
[58] Field of Search ................. 210/78, 23 H, 22, 259, 210/321, 345, 346, 331, 380, 500 M, DIG. 23, 195 M, 433 M

[56] References Cited

U.S. PATENT DOCUMENTS 3,669,879 6/1972 Berriman ................... 210/321 R X
4,092,113 5/1978 Hardy .......................... 210/DIG. 23

Primary Examiner—S. Leon Bashore, Jr.
Assistant Examiner—Ferris H. Lander
Attorney, Agent, or Firm—Albert Macovski

[57] ABSTRACT

Salt water and other solutions are accelerated in a rotating structure and applied to a cannister containing reverse osmosis membrane material. The desalinated water is removed after passing through the large surface area concentration of membrane material in the cannister. The enriched brine is removed from the cannister at a point furthest from the axis of the rotating structure and returned to the vicinity of the axis to prevent the buildup of dense material. The membrane material is configured in the cannister so that the flow is generally radially with respect to the axis of the rotating structure.

13 Claims, 7 Drawing Figures

ROTATING SOLUTION SEPARATION SYSTEM

BACKGROUND OF THE INVENTION

1. Field of the Invention

This invention relates to systems for providing changes in the concentration of solutions. In a primary application the invention relates to the desalinization of salt water.

2. Description of Prior Art

Desalinization by reverse osmosis first became a possibility with the development of suitable membranes in the 1950's. An early reference on the subject is "Seawater Demineralization by Means of an Osmotic Membrane," by S. Loeb and S. Sourirajan in the *Advancements in Chemistry Series*, 38 p. 117, 1962. Development has followed two paths; the improvement of the integrity and performance of the membrane material itself, and finding suitable packaging and support for the membrane. The membrane material development has aimed at eliminating pin holes, maintaining uniformity and obtaining materials which impede the flow of salt while giving large water flows for pressures in excess of the osmotic pressure.

These problems are considerably augmented for high concentrations of salt, as is found in sea water, where the osmotic pressure is high. Because the process is driven by pressure, confining containers are required for the membranes. Many packing configurations have been used which attempt to provide a large surface area in a given volume in such a way that the membrane is supported and that a flushing action of the brine can occur. Earlier most practical desalinating has been accomplished at low concentrations of salt of the order of 3,000 parts per million. Recently membranes have become commercially available for salt concentrations in the seawater range of 35,000 ppm. These membranes are available from UOP in the spiral wound type and from Dupont and Dow in the hollow fiber type.

Much prior art exists in rotating structures of the centrifuge type. These produce a high acceleration that then acts differently on materials of different density. The primary purpose of a centrifuge is to separate by means of density differences. However, when rotating structures are used in reverse osmosis accelerators, the primary separation occurs in the membrane due to a pressure difference. The density difference is useful to clean the membranes and not to effect a separation.

There are four patents in the prior art which deal with rotating structures accelerating fluids through reverse osmosis membranes and which appear to be the most relevant as background to this invention: U.S. Pat. No. 3,355,382, "Centripetal Acceleration Method and Apparatus," issued to M. G. Huntington is aimed at primarily preventing the excessive concentration of dense brine at the membrane. The membranes, in this patent, are arranged in concentric cylinders in the form of a basket. This configuration provides a limited amount of surface area of the membrane material for the salt water. This limits the conversion efficiency into desalinated water. In addition, this basket configuration of membrane material is difficult to replace. The desalinated water is returned to the axis of rotation after passing through the membrane material. As a result, an additional external source of pressure is required to drive the brine solution through the reverse osmosis membranes.

A similar system is described in U.S. Pat. No. 3,400,074, "Centrifugal Reverse Osmosis for Desalinization," issued to C. A. Grenci. In this patent the reduced concentration mixture, representing desalinated water, is taken off at the outer portion of the cylinder, thus providing the required pressure. The increased concentration mixture, representing dense brine, is not flowed to an outer radial point but is discharged at an inner radius of the rotating structure. This limits the ability to prevent the buildup of dense materials of the membranes which cause stagnation. This patent also uses the cylindrical membrane configuration with its limited surface area and replacement difficulties.

U.S. Pat. No. 3,567,030, "Reverse Osmosis Apparatus," by R. J. Loeffler and H. M. Bradbury has an excellent general description of the reverse osmosis process using centrifugally accelerated fluid mixtures. The rotating structure, of itself, provides the desired increased pressure for reverse osmosis, without requiring additional pumping. As with the previous patents, the cylindrical membrane configuration is used. The increased pressure brine solution flows radially inward through the membranes toward the axis of the rotating structure. This flow thus opposes the outward radial flow of the enriched brine. The enriched brine is removed from a region near the outer radius of the rotating structure.

U.S. Pat. No. 3,669,879, "Fluid Separation Apparatus and Method," issued to L. P. Berriman uses a cylindrical configuration similar to that described by Huntington. This patent describes a nozzle arrangement whereby the expelled desalinated water helps to rotate the basket. It also describes a variety of membrane configurations which fit within a basket shaped configuration in the rotating cylinder. These configurations utilize both cylindrical and radial membrane formations. The concentrated brine is exited at the outer radius of the rotating structure.

SUMMARY OF THE INVENTION

An object of the invention is to provide a system for obtaining a reduced concentration solution and an increased concentration solution from an original solution. A further object of this invention is to provide a package of reverse osmosis membrane material which has a high concentration of surface area and is readily replaceable. A further object of this invention is to provide a system for flowing a solution through reverse osmosis membrane material without causing an excessive buildup of dense materials. A further object of this invention is to provide a system of desalinating sea water and producing desalinated water.

Briefly, in accordance with the invention an incoming solution is accelerated in a rotating structure and applied to one or more dense packages of reverse osmosis membrane material which are mounted at off-axis positions. These packages of membrane material are contained in supporting cannisters. The accelerated original solution is applied at the portion of the cannister closest to the axis of the rotating structure. The reduced concentration solution is removed from the outer radius of the rotating structure after flowing through the membrane material. The increased concentration material, which has not flowed through the membrane material, is removed from the outer radius and returned to the vicinity of the axis of the rotating structure so as to prevent the buildup of dense material on the membranes. A stationary outer shroud and a closely fitting rotating inner shroud as used to remove the reduced concentration solution and minimize windage losses.

BRIEF DESCRIPTION OF THE DRAWINGS

For a more complete disclosure of the invention, reference may be made to the following detailed description of several illustrative embodiments thereof which is given in conjunction with the accompanying drawings, of which.

DESCRIPTION OF THE PREFERRED EMBODIMENT

Figure 1:
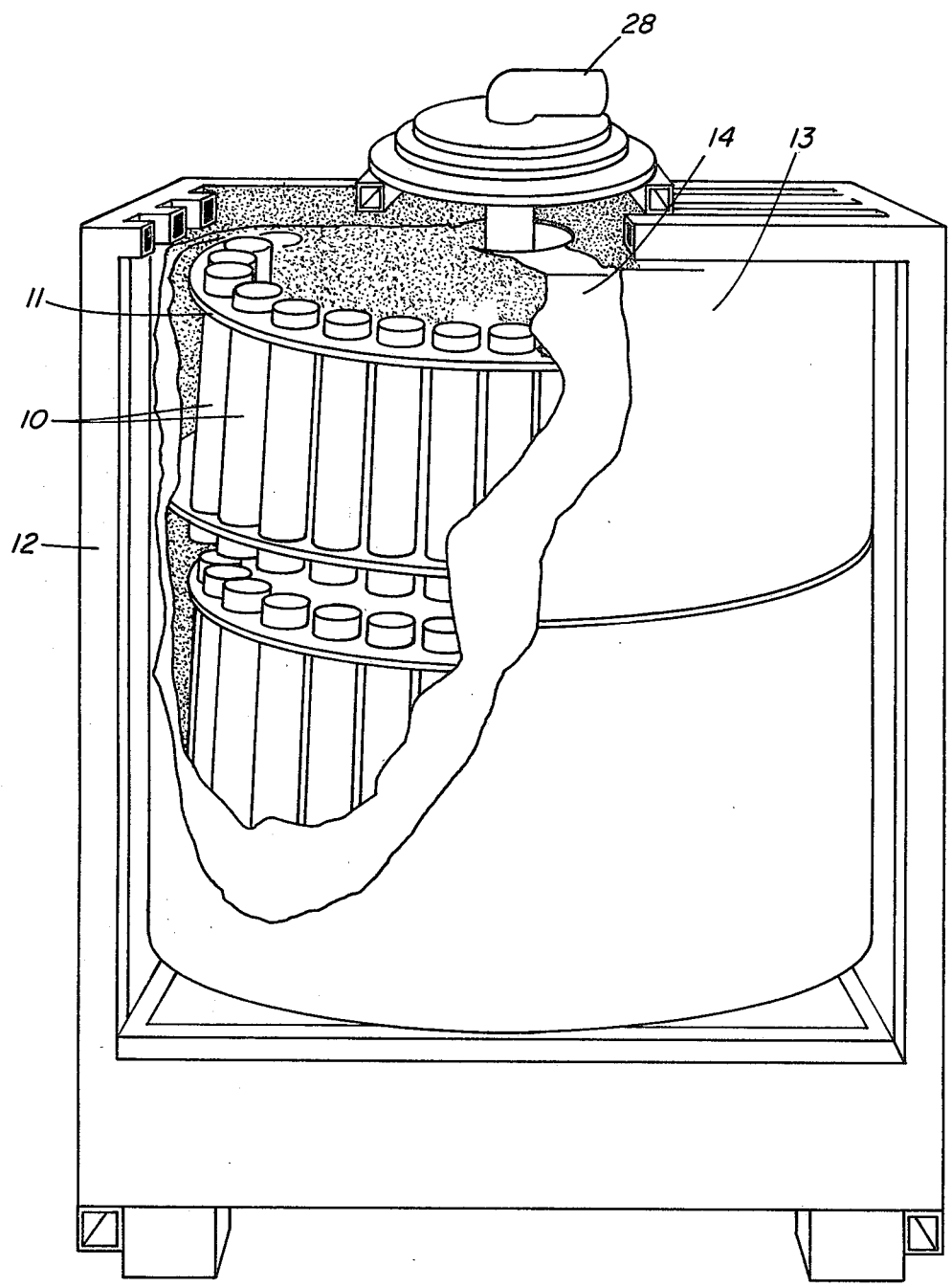
FIG. 1 is an illustration of an embodiment of the invention using a plurality of cannisters.
Figure 2:
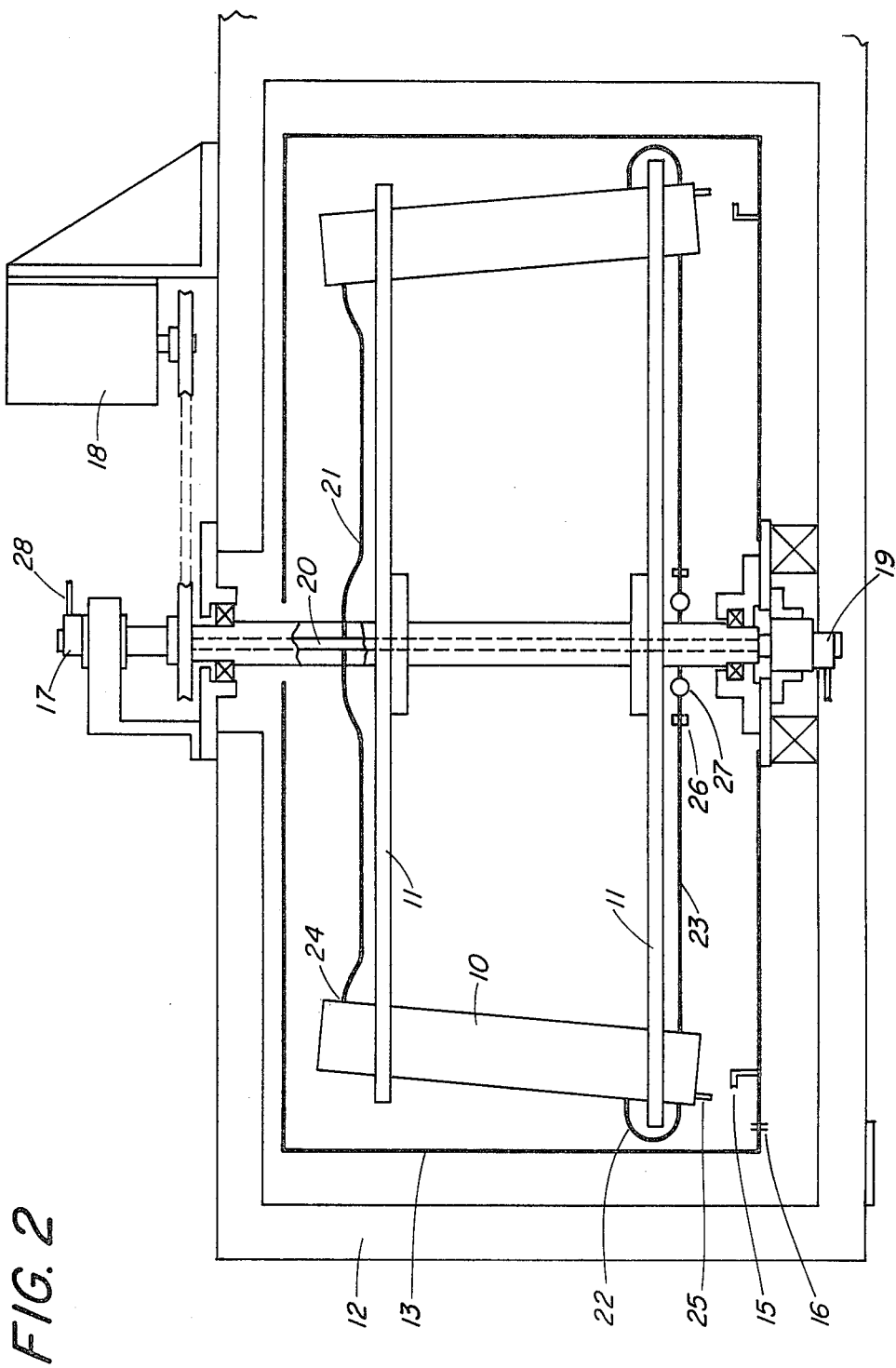
FIG. 2 is a cross-sectional view of an embodiment of the invention.

An understanding of the broad aspects of the invention may best be had by reference to FIGS. 1 and 2 of the drawings. FIG. 1 is an illustrative view and FIG. 2 is a cross-sectional view of a preferred embodiment of the invention. The system accepts an original solution and produces both an increased concentration solution and a decreased concentration solution using reverse osmosis membrane material. A primary application is the desalinating of water where the original solution is brine, the increased concentration solution is enriched brine, and the desired decreased concentration solution is desalinated water. These terms will often be used in the description of the patent interchangeably with the general terms referring to the relative concentration of a solution.

The accelerator is a rotating structure enclosed in a stationary frame 12 as shown which is driven by motor 18 using suitable drivers and pulleys. The original solution, or brine is applied at entry port 28 at the axis of rotation. The cannisters 10, containing the packages of reverse osmosis membrane material are mounted on the off-axis supporting structure 11. The incoming brine flows through rotating union 17, along the passage in the shaft 20 into radial lines 21. The brine is accelerated, due to the rotation of the rotating structure, as it travels along radial lines 21 to the brine entry port 24 in cannister 10. The increased pressure original solution, or brine, then flows through the reverse osmosis membrane package in cannister 10.

The portion of the brine which does not flow through the membrane becomes the increased concentration solution or enriched brine. It is important that this dense material does not collect on the reverse osmosis membranes and cause clogging and reduced flow. This is prevented by the radial flow of the enriched brine in the direction of the centrifugal acceleration. Thus the brine enters at the portion of the cannister 24, which is closest to the axis of the rotating structure, and the enriched brine exits at the brine exit port 22 which is at the outermost radius of the rotating structure. As is noted the cannister 10 is canted so that the entry port 24 becomes closest to the axis of the rotating accelerator and the brine exit port 22 becomes furthest from the axis.

The desalinated water, or decreased concentration solution, is derived from that portion of the brine which flows through the reverse osmosis membrane material. The rotation causes pressure to buildup in the brine feed lines 21. It is this pressure which effects the desalinization by the reverse osmosis action. The desalinated water is collected in cannister 10 and flung out using exit port 25. The decreased concentration solution is collected by trough 15 in stationary outer shroud 13. The desalinated water is removed through exit 16. To reduce windage losses in the rotating structure an inner rotating shroud 14 is used as shown in FIG. 1. It rotates with the rotating structure and is closely fitted to outer shroud 13 to minimize windage.

The brine exiting at port 22 is returned to the vicinity of the axis using return lines 23. The enriched brine can be monitored for salinity by a conductivity cell 26 and throttled for flow control in the cannisters 10 by remote valve 27. This valve can also be used for isolating a cannister. By placing this valve 27 close to the axis, low pressure control is achieved. The enriched brine is then removed through rotating union 19.

In the embodiment of FIG. 2 the enriched brine, or increased concentration solution, is returned to the axis of the rotating structure. Thus the flow of brine through the system is supplied by some means for increasing the pressure of the incoming brine such as a pump which is not shown. In a subsequent embodiment a method is shown of using the rotating structure itself to pump the brine through the system.

Because the brine is returned to the center line or axis of the rotating structure, and exhausted in essentially the same energy state as at the input, the flow of brine through the system occurs with little energy penalty. In a conventional reverse osmosis system, the feed brine is pumped up to a high pressure by a pump before entering the membrane containing cannister. Upon leaving the cannister, the pressure is dropped with a loss of all the energy in the exiting flow. Whereas in a conventional reverse osmosis system efficient use of energy means that high recoveries must be obtained, the rotating accelerator design is able to operate at low recovery ratios with no disadvantage in energy. This becomes a distinct advantage with high salinity brines such as sea water because raising the concentration further, as in a high recovery operation, unnecessarily increases the osmotic pressure. In addition, increased concentrations tend to precipitate out materials that may clog the membrane.

In terms of the flow rate of fresh water, Q, the power W in a conventional system, without a recovery turbine, to desalinate can be written as $$W = \frac{PQ}{\epsilon \eta}$$

where P is pressure used, $\epsilon$ is pump efficiency and $\eta$ is recovery ratio (parts fresh water/parts brine). The power to desalinate in the rotating accelerator can be written as $w = 2\ PQ + \text{windage}.$ The factor of 2 takes into account unrecovered kinetic energy of the desalinated water flung against the recovery shroud. In large units the windage and other losses can be held to a small fraction of the other power costs.

For a 250,000 gal/day plant we have estimated the losses at 0.5 PQ. As energy advantage accrues to the rotating accelerator whenever the recovery is less than 0.4 (greater as the pump efficiency is taken into consideration). Membrane manufacturers rate their seawater membrane at 30% recovery and do not recommend use at 40% if life of the membrane is a consideration. In the seawater application, the rotating accelerator has a distinct advantage in the energy consumed.

Operating membrane packages at lower recovery ratios means that the membranes will pass more water due to the lower concentration and osmotic pressure, and hence that less membrane is necessary to achieve a given plant size. Lower concentrations also mean longer times between membrane cleanings and longer life.

One of the annoying problems in conventional systems, that of excessive concentration polarization, is also reduced in the rotating accelerator design. Near the membrane surface, the brine concentration is increased due to the depletion of water. This increased concentration means that the membrane sees a higher concentration than that of the average, or that would be present if the material were well-mixed. In the conventional reverse osmosis practice, the flow of water is relied upon to scrub the concentration polarization. This scrubbing action requires a flow, an inconsistency with the desire for efficient use of energy, to achieve a high recovery ratio. In the rotating accelerator, however, there is no inconsistency. Much more flow than is needed can easily be provided, to the point where an excessive flow pressure drop is experienced. In addition, the centrifuge type of action aids in removing the increased density brine from the membrane surface.

The ability of the centrifuge action to clean the membrane suggests one of the more important features of the rotating accelerator design, the ability to do away with pretreatment. Pretreatment is required to remove small particles, colloids and the like, before entering the membrane package, in conventional reverse osmosis systems. Chemicals are also added to prevent precipitation in the membrane chambers as the concentration of the brine rises.

Figure 3:
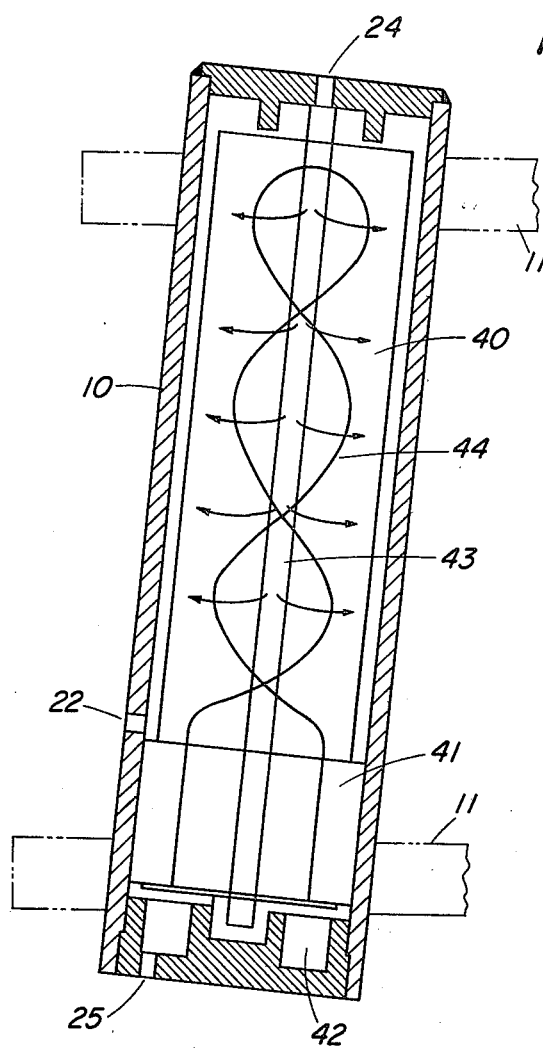
FIG. 3 is a detailed view of a cannister embodiment for use with a particular hollow fiber membrane package.
Figure 4:
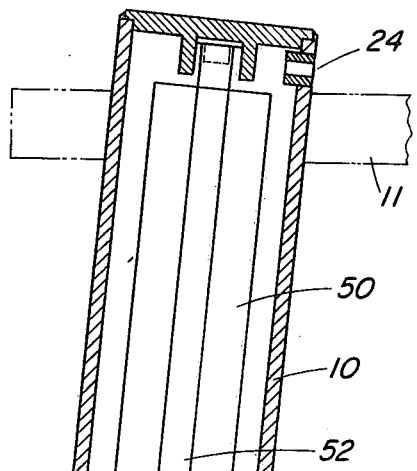
FIG. 4 is a detailed view of a cannister embodiment for use with a particular spiral wound membrane package.
Figure 5:
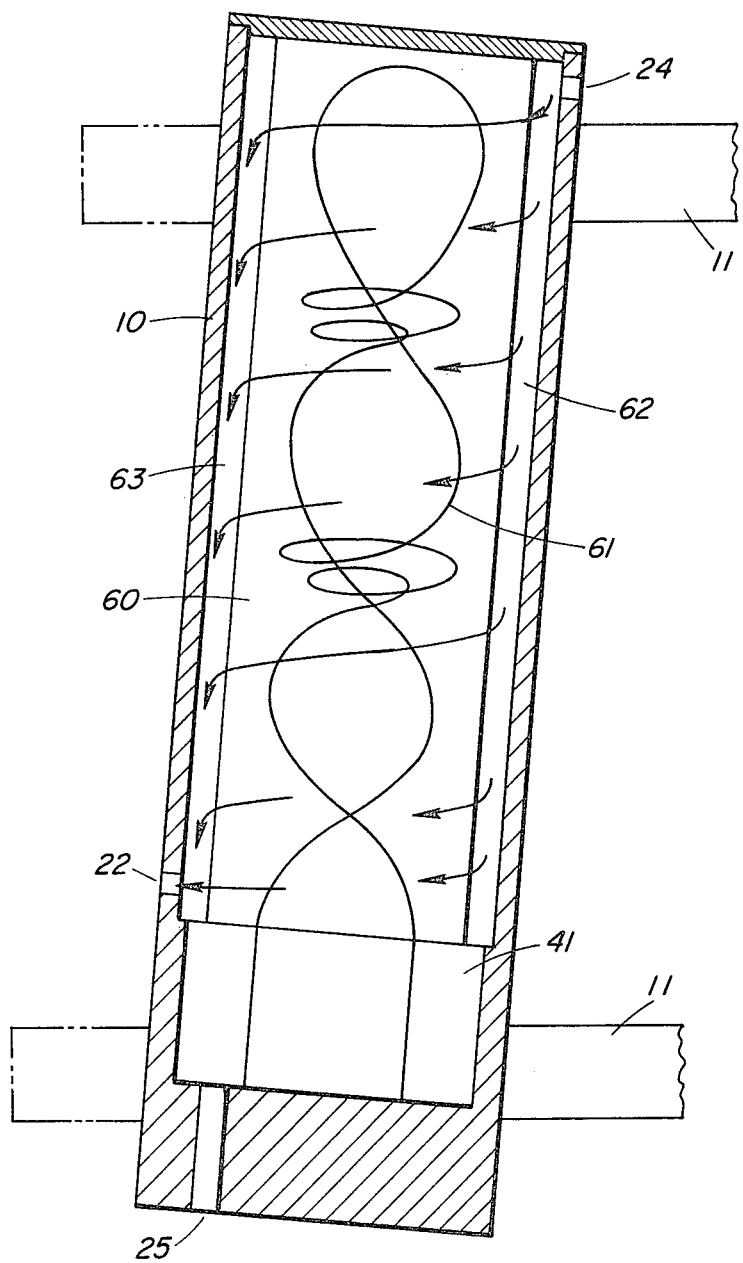
FIG. 5 is a schematic representation of a cannister embodiment with a preferred membrane package.

FIGS. 3, 4 and 5 relate to embodiments of cannisters. These cannisters contain and support the package of reverse osmosis membrane material. Although cylindrical structures are shown, these cannisters can have any shape, such as cubes, which can adequately contain the membrane package when it is subjected to high pressure fluids. It is preferable that an array of separate membrane packages be used rather than a continuous annular structure. The cannisters containing separate membrane packages allow for individual control and for the removal and replacement of each membrane package. Also the cannister configuration greatly facilitates the support of membrane packages having large surface area which can be conveniently manufactured. The cannisters could be in the form of an array of cylindrical hollows in a solid structure rather than an array of cylindrical shells as shown in FIGS. 1 and 2.

A continuous annular structure can be used, however, with its associated control problems and difficulty in construction. To achieve the "canted" configuration with an entry port at an inner radius and an exit port at an outer radius the annular structure would have inner and outer walls which are truncated cones.

FIG. 3 is a cannister configuration for a hollow-fiber reverse osmosis membrane package 40 of the type made by Dow Chemical Co. A similar package is made by DuPont Co. This membrane package 40 is not optimum for the system described because the original solution or brine enters the center 24 of the membrane package 40 rather than at a point closest to the axis of the rotating structure as was shown in FIG. 2. The problem with this configuration is that some of the brine of increasing salinity is made to move opposite to the general flow due to the centrifuge type action of the rotating accelerator. This limits the ability to remove concentrated brine from the membrane surface. A preferred hollow-fiber package is shown in FIG. 5 and will be subsequently described.

The cannister of FIG. 3 can, however, operate in the system shown in FIGS. 1 and 2 with reduced performance. The cannister 10 is rotated on the rotating accelerator using supporting arms 11. The accelerated brine flows into entry port 24 and into perforated tube 43 running down the unit. The brine which does not penetrate the membranes flows radially with respect to the cannister over the outside of the hollow fibers 40 and out through the enriched brine exit port 22. The cant of the cannister causes the enriched brine to flow to exit port 22. The brine which does penetrate the membranes of the hollow fiber package 40 flows through the hollow fibers through the header 41 and into collection plenum 42. The desalinated water, or reduced concentration solution, is flung out through the desalinated water exit port 25. A representative single hollow fiber 44 is shown which is one of many interwound in the hollow fiber membrane package 40.

FIG. 4 shows an alternate cannister configuration for a spiral wound reverse osmosis membrane package of the type manufactured by UOP. In this configuration the flow has the desired pattern where the brine enters at the region closest to the axis of the rotating structure and the enriched brine exists at the region furthest from the axis. The cannister 10 is supported on the rotating accelerator by radial arms 11. The original solution, or brine, enters at inlet 24 where it is forced to flow along the surface of membrane package 50. This membrane package 50 is a sheet-like form tightly wrapped around central tube 52 that collects the desalinated water. The cross-sectional view of the wrapped membrane sheet is a spiral. The enriched brine, which has not flowed through the membrane, is collected in a plenum 51 and funneled to the exit port 22. Because of the cant of cannister 10 exit port 22 is at a region furthest removed from the axis of the rotating structure. Thus the enriched brine is moved by the centrifuge type action of the rotating structure. This prevents pockets of enriched brine from accumulating on the spiral-wound membrane package 50.

FIG. 5 shows a preferred cannister configuration using hollow fibers where, unlike FIG. 3, the brine flows in the radial direction of the rotating structure. A hollow fiber membrane passage 60 is used with an array of wound fibers, such as fiber 61, which begin and end in the header 41. The membrane package 61 is flanked by flow distribution channels 62 and 63. Channel 62 is closest to the axis of the rotating structure and receives the incoming brine while channel 63 is furthest from the axis and collects the enriched brine. These channels can be part of the replacable fiber package. This package is supported by cannister 10 which is attached to the rotating structure in a canted position with arms 11. The original solution enters at 24 and enters the membrane package through distribution channel 62. The brine which flows through the reverse osmosis membrane, as before, leaves exit port 25 as a reduced concentration solution or desalinated water. The brine which does not penetrate the membrane is collected in flow distribution channel 63 and leaves exit port 22 as an increased concentration solution of enriched brine. Here we have the desirable situation that the brine flows in the outward radial direction as accelerated by the rotating structure. To accommodate higher through flows of brine, which would otherwise result in excessive pressure drops, it is desired to slightly reduce the packing density of the fibers as compared to the commercially available units.

Figure 6:
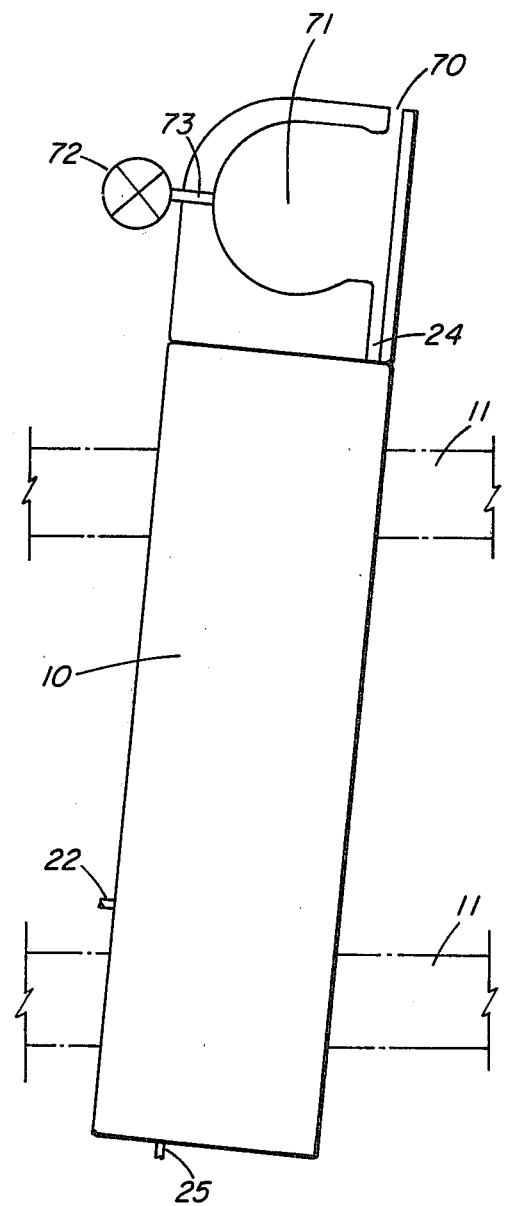
FIG. 6 is a schematic representation of a precentrifuging chamber.

FIG. 6 shows a precentrifuging system. Concern about contaminating the membrane with unfiltered substances can be alleviated by precentrifuging the feed brine. A precentrifuging chamber 71 is attached to cannister 10. The cannister is attached to the rotating structure with arms 11. The brine is fed into precentrifuging port 70. The exit of the precentrifuging chamber is brine entry port 24 of cannister 10. An exit port 73 is provided at the radial extremity of chamber 71, with control valve 72, to remove dense material and prevent it from entering cannister 10.

Figure 7:
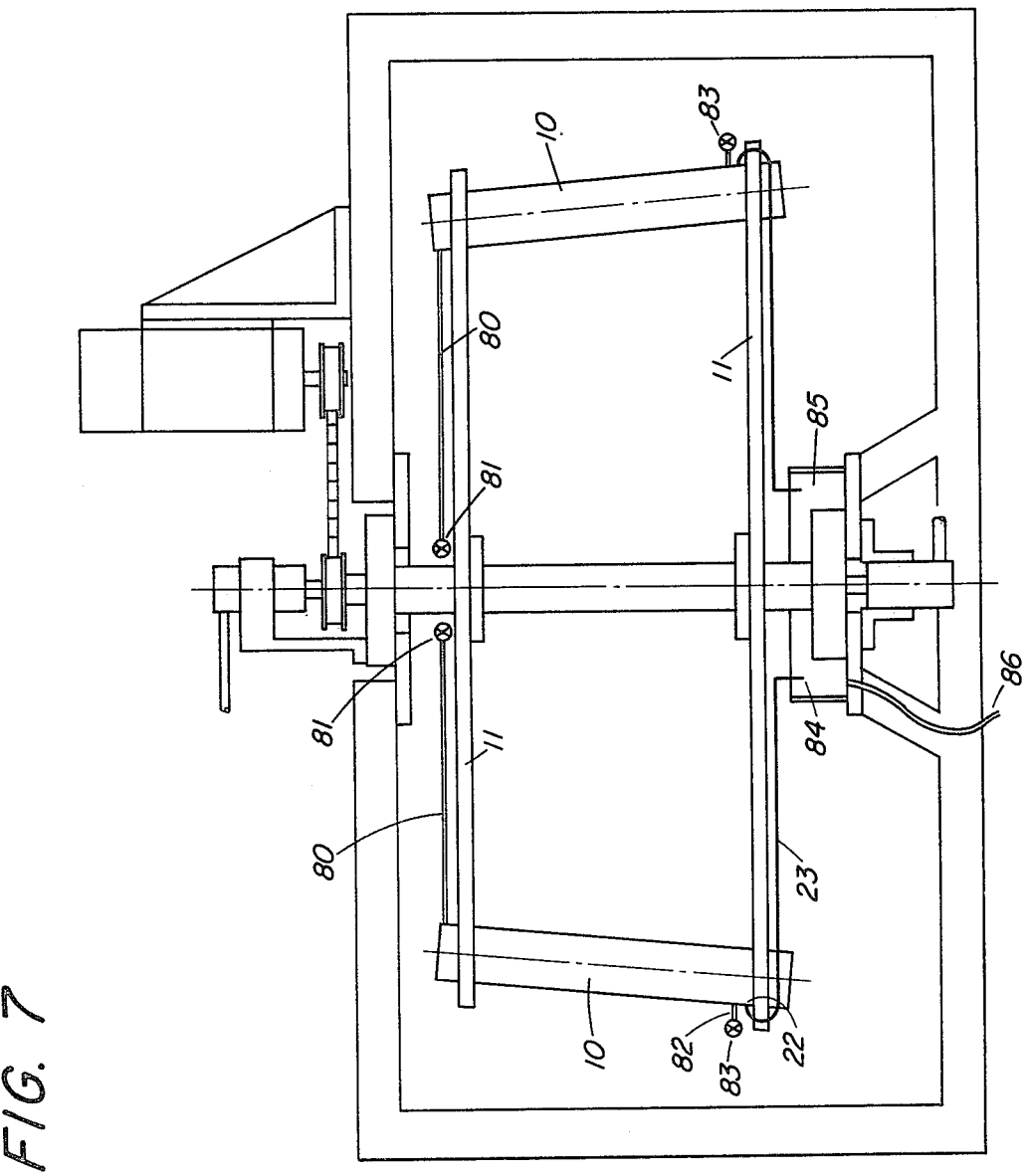
FIG. 7 is a cross-sectional view of an embodiment of the invention showing clearing vents, valves and an off-axis return arrangement.

FIG. 7 shows some additional lines and valves for the relief of low and high density materials from the cannisters. The low density line 80 leads from an inboard portion of the brine channel in cannister 10 to a position close to the axis of the rotating structure. A valve 81 at this point can relieve low density materials from the cannister such as trapped gas and oil. Note that the valve 81 is located close to the axis so that it can be a low pressure valve.

If precentrifuging is not involved, it may be desirable to have a high density relief port 82 and control valve 83 close to the point in the brine channel in cannister 10 furthest removed from the axis of the rotating accelerator for removal of dense materials. Note that this would be close to brine exit port 22. Normally brine exit port 22 would handle the flow, but particles of sand or other heavy material could conceivably stop the flow.

In FIG. 2 the enriched brine return line 23 was returned to the axis so that some external pressure is required to pump the brine through the system. This requirement is eliminated in FIG. 7 with an off-axis enriched brine return. The brine return line 23 exits at off-axis point 84 with the enriched brine collecting in well 85. The enriched brine is drained from well 84 using line 86. In this way the rotation of the rotating structure pumps the brine through the system.

The basic system requires only a single off-axis cannister for its operation. Additional cannisters placed at various off-axis regions provide greater volume flow. As shown in FIGS. 1 and 2, a convenient arrangement is a single continuous circle of cannisters surrounding the axis. Other multiple cannister configurations can be used such as concentric circles of cannisters around the axis of the rotating accelerator.

The primary application of this system, as described, is the desalination of seawater. A high-performance operating system has been constructed and tested for this application area. However, many other application areas can be used where an original solution is separated into an increased concentration and a decreased concentration solution. For example the system can be used where the original solution is paint and the decreased concentration solution includes undesired water. In this case the increased concentration solution is the desired useful output. In general, the ability to clean the membrane surface by the centrifuge action suggests that the rotating accelerator would be useful in industrial applications involving solvent removed from colloidal materials.

What is claimed is:

1. Apparatus for providing a reduced concentration solution and an increased concentration solution from an original solution comprising:
   a rotating structure having an entry port for the original solution at its axis of rotation;
   a cannister consisting of a confined container of reverse osmosis membrane material mounted at an off-axis position on the rotating structure;
   means for radially flowing the original solution to the off-axis position and through the reverse osmosis membrane material to provide a reduced concentration solution;
   means for collecting that portion of the original solution which has not flowed through the reverse osmosis membrane to provide an increased concentration solution; and
   means for rotating the rotating structure.

2. Apparatus as recited in claim 1 including means for throwing off the reduced concentration solution from the portion of the cannister furthest radially removed from the axis of the rotating structure.

3. Apparatus as recited in claim 1 wherein the means for collecting the increased concentration solution includes means for returning the increased concentration solution to the vicinity of the axis of the rotating structure.

4. Apparatus as recited in claim 3 wherein the increased concentration solution is returned to the axis of the rotating structure and including means for flowing the increased concentration solution through the cannister.

5. Apparatus as recited in claim 3 wherein the increased concentration solution is returned to a region displaced from the axis of the rotating structure whereby the rotary action provides a pumping action for the increased concentration solution.

6. Apparatus as recited in claim 1 further comprising:
   a plurality of additional cannisters, substantially equivalent to the first cannister, containing reverse osmosis membrane material mounted at off-axis positions on the rotating structure;
   means for flowing the original solution through the reverse osmosis membrane material of the plurality of additional cannisters and providing further amounts of reduced concentration solution; and
   means for collecting that portion of the original solution which has not flowed through the reverse osmosis material of the plurality of additional cannisters and providing further amounts of increased concentration solution.

7. Apparatus as recited in claim 6 wherein the first cannister and the plurality of additional cannisters form a circle with each cannister being at the same radial distance from the axis of the rotating structure.

8. Apparatus as recited in claim 6 including an inner rotating shroud, connected to the rotating structure, which surrounds the first cannister and the plurality of additional cannisters.

9. Apparatus as recited in claim 8 including an outer stationary shroud, closely fitted to the inner rotating shroud, and including means for collecting the reduced concentration solution in the outer shroud whereby the windage losses are minimized.

10. Apparatus as recited in claim 1 including means for precentrifuging the original solution before it enters the cannister whereby undesirable substances are purged.

11. Apparatus as recited in claim 1 including means for controlling the flow of the original solution near the axis of the rotating structure whereby the control takes place in a region of lower pressure.

12. Apparatus as recited in claim 1 including an inboard relief line at the portion of the cannister closest to the axis of the rotating structure whereby low density materials are removed.

13. Apparatus as recited in claim 1 including an outboard relief port at the portion of the cannister furthest removed from the axis of the rotating structure whereby high density materials are removed.

* * * * *